US006256583B1

(12) United States Patent
Sutton

(10) Patent No.: US 6,256,583 B1
(45) Date of Patent: Jul. 3, 2001

(54) GPS ATTITUDE DETERMINATION SYSTEM AND METHOD USING OPTIMAL SEARCH SPACE IDENTIFICATION FOR INTEGER CYCLE AMBIGUITY RESOLUTION

(75) Inventor: Eric Sutton, Coralville, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/154,378

(22) Filed: Sep. 16, 1998

(51) Int. Cl.$^7$ ....................................................... G06F 7/00
(52) U.S. Cl. ........................................ 701/215; 342/357.11
(58) Field of Search .................................. 701/4, 13, 207, 701/213–215; 342/352, 357.02, 357.03, 357.04, 357.06, 357.11, 357.12

(56) References Cited

U.S. PATENT DOCUMENTS

| | | | |
|---|---|---|---|
| 5,602,741 | * 2/1997 | Talbot et al. | 701/213 |
| 5,610,614 | * 3/1997 | Talbot et al. | 342/357.15 |
| 5,825,326 | * 10/1998 | Semler et al. | 342/357.04 |
| 5,903,236 | * 5/1999 | Lawrence | 342/357 |
| 5,917,448 | * 6/1999 | Mickelson | 342/442 |
| 5,935,194 | * 8/1999 | Talbot et al. | 701/214 |
| 6,005,514 | * 12/1999 | Lightsey | 342/357.11 |
| 6,052,647 | * 4/2000 | Parkinson et al. | 701/215 |

OTHER PUBLICATIONS

Eric Sutton, "Optimal Search Space Identification for Instantaneous Integer Cycle Ambiguity Resolution", ION–GPS–97 Conference, Sep. 17, 1997.

Brown, R., "Instantaneous GPS Attitude Determination," Proc. of IEEE Position Location and Navigation Symposium (PLANS '92), pp. 113–120, Monterey, California, Mar. 1992.

Euler, H.J. and C.D. Hill, "Attitude Determination Exploiting All Information for Optimal Ambiguity Resolution," Proc. of ION–GPS–95, pp. 1751–1757, Palm Springs California, 1995.

Hatch, R., "Ambiguity Resolution in the Fast Lane," Proc. of ION–GPS–89, pp. 45–50, Colorado Springs, Colorado, 1989.

Hill, C.D. and H.–J. Euler, "An Optimal Ambiguity Resolution Technique for Attitude Determination," Proc. of IEEE Position Location and Navigation Symposium (PLANS '96), pp. 262–269, Atlanta Georgia, Apr. 22–26, 1996.

Knight, D., "A New Method of Instantaneous Ambiguity Resolution," ION–GPS–94, pp. 707–716, Salt Lake City, Utah, Sep. 20–23, 1994.

Macabiau, C. and A. Benhallam, "Analysis of the Error Probability and Stopping Time of the MAPAS Procedure," Proc. of ION–GPS–96, pp. 925–934, Kansas City, Missouri, Sep. 17–20, 1996.

(List continued on next page.)

Primary Examiner—William A. Cuchlinski, Jr.
Assistant Examiner—Edward Pipala
(74) Attorney, Agent, or Firm—Nathan O. Jensen; Kyle Eppele; James P. O'Shaughnessy

(57) ABSTRACT

Disclosed are an integer cycle ambiguity resolution method, and attitude determining systems and apparatus using the same. In the method of determining a solution to an integer cycle ambiguity, four primary satellites out of a GPS satellite constellation are selected such that a number of false solutions for the integer cycle ambiguity is optimized. Next, a search space is defined such that the probability of rejecting a correct solution for the integer cycle ambiguity is guaranteed-to be below a predetermined value. Next, intervals in the defined search space are searched to determine a solution to the integer cycle ambiguity. Then, attitude is determined as a function of the determined solution to the integer cycle ambiguity.

20 Claims, 3 Drawing Sheets

OTHER PUBLICATIONS

Quinn, P.G., "Instantaneous GPS Attitude Determination," Proc. of ION–GPS–93, pp. 603–615, Salt Lake City, Utah, Sep. 22–24, 1993.

Teunissen, P.J.G., P.J. de Jonge and C.C.J.M. Tiberius, "On the Spectrum of the GPS DD–ambiguities," Proc. of ION–GPS–94, pp. 115–124, Salt Lake City, Utah, Sep. 20–23, 1994.

Teunissen, P.J.G., P.J. de Jonge and C.C.J.M. Tiberius, "The Volume of the GPS Ambiguity Search Space and its Relevance for Integer Ambiguity Resolution," Proc. of ION–GPS–96, pp. 889–898, Kansas City, Missouri, Sep. 17–20, 1996.

* cited by examiner

GPS ATTITUDE DETERMINATION SYSTEM AND METHOD USING OPTIMAL SEARCH SPACE IDENTIFICATION FOR INTEGER CYCLE AMBIGUITY RESOLUTION

FIELD OF THE INVENTION

The article by Eric Sutton entitled "Optimal Search Space Identification for Instantaneous Integer Cycle Ambiguity Resolution," presented at the ION-GPS-97 Conference on Sep. 17, 1997, is herein incorporated by reference.

The present invention relates to global positioning system (GPS) attitude determining apparatus, systems and methods. More particularly, the present invention relates to instantaneous integer cycle ambiguity resolution methods, and systems and apparatus using the same.

BACKGROUND OF THE INVENTION

GPS attitude determination systems use GPS phase measurements to determine the orientation of a baseline defined by two antennas. Because antenna separation is generally greater than one wavelength, there is an integer ambiguity for each satellite that must be determined before the orientation of the baseline can be calculated. Since for attitude determination the baseline length is precisely known, the initial integer ambiguity search seeks to identify all solutions that result in a baseline length close to the true baseline length.

Integer cycle ambiguity resolution is a problem commonly encountered in GPS applications such as attitude determination and kinematic positioning. There are many recent papers on the design and performance of ambiguity resolution algorithms for kinematic positioning. Ambiguity resolution for attitude determination is different from ambiguity resolution for kinematic positioning in that for attitude determination the baseline is generally relatively short and the baseline length is very precisely known. Therefore, for attitude determination systems, the initial integer cycle ambiguity search is generally performed in solution space instead of measurement space. In other words, the initial search is based on baseline length instead of on the phase residual.

It has been shown in several recent papers that instantaneous ambiguity resolution is often possible for attitude determination systems. There are two principal design issues for ambiguity resolution: (1) Determination of the smallest possible search space from all available information and design requirements; and (2) Efficient identification of all solutions that lie in the search space. Due to the fundamental structure of the problem, an instantaneous ambiguity resolution algorithm cannot guarantee that it will produce exactly one solution, and even when exactly one solution is produced, it cannot guarantee that the solution is correct.

SUMMARY OF THE INVENTION

Disclosed are an integer cycle ambiguity resolution method, and attitude determining systems and apparatus using the same. In the method of determining a solution to an integer cycle ambiguity, four primary satellites out of a GPS satellite constellation are selected such that a number of false solutions for the integer cycle ambiguity is optimized. Next, a search space is defined such that the probability of rejecting a correct solution for the integer cycle ambiguity is guaranteed to be below a predetermined value. Next, intervals in the defined search space are searched to determine a solution to the integer cycle ambiguity. Then, attitude is determined as a function of the determined solution to the integer cycle ambiguity.

DETAILED DESCRIPTION OF THE PREFERRED EMBODIMENTS

The present invention includes a method or algorithm that uses the QR decomposition of the line of sight matrix to simplify the integer cycle ambiguity search. In addition, the present invention includes methods of determining the parameters of the search so that the probability of rejecting the true solution is guaranteed to be less than some chosen value, and so that the number of false solutions can be controlled.

Figure 1:
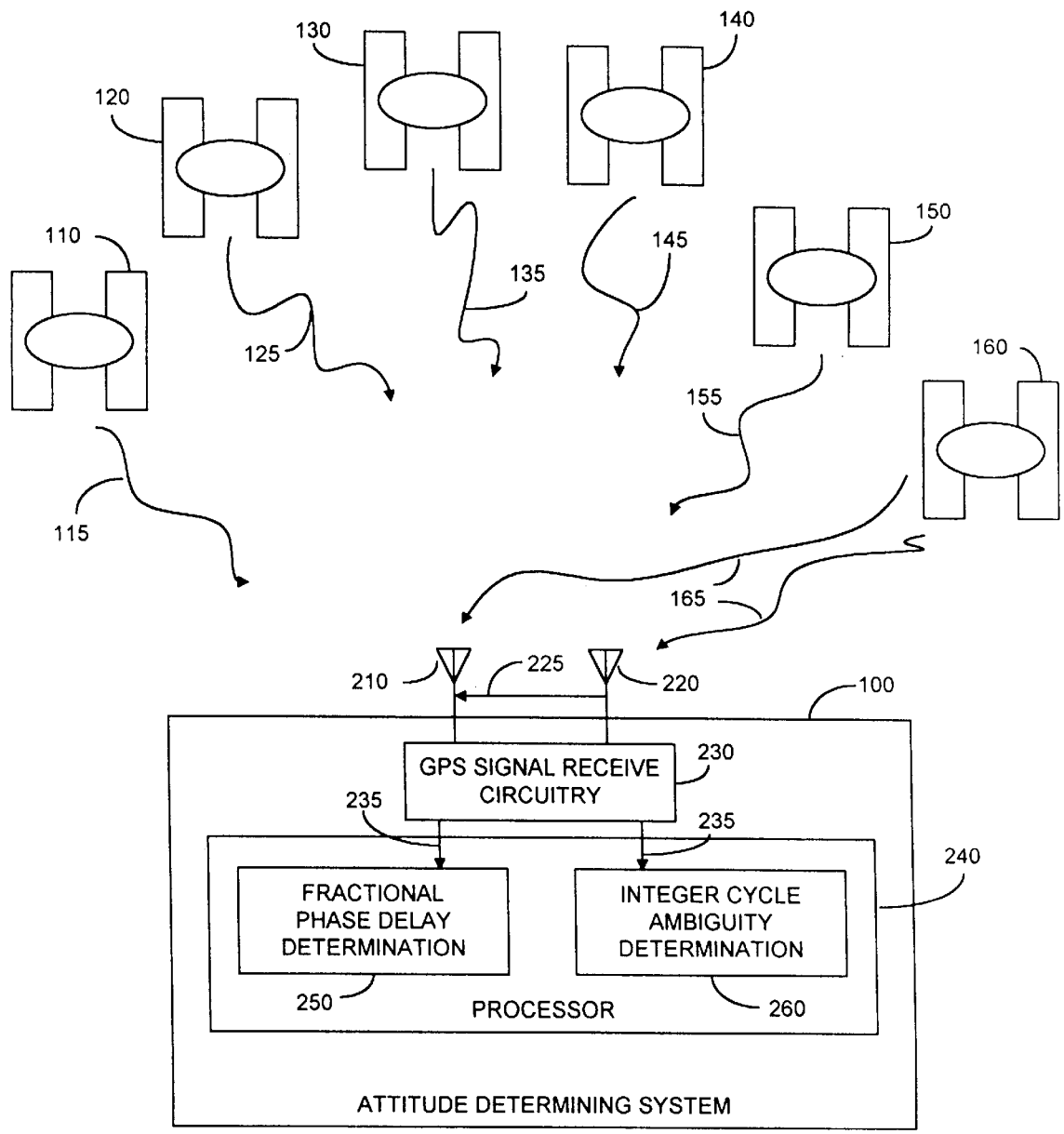
FIG. 1 is a block diagram illustrating an attitude determining system or apparatus in accordance with embodiments of the present invention.

FIG. 1 is a block diagram illustrating attitude determining system 100 in accordance with the present invention. Attitude determining system 100 is a GPS attitude determining system which determines attitude as a function of phase delays, measured between two antennas, in global positioning signals from four visible satellites in the GPS constellation. For illustrative purposes, attitude determining system 100 is shown as operating in an environment in which there are six "visible" GPS satellites. The term "visible" is intended to generally represent positions of GPS satellites which are in the line of sight of system 100, with no signal obstructions preventing receipt of the corresponding GPS positioning signals.

As illustrated in FIG. 1, GPS satellites 110, 120, 130, 140, 150 and 160 are visible or are within the line of sight of attitude determining system 100. Satellites 110, 120, 130, 140, 150 and 160 transmit GPS satellite positioning signals 115, 125, 135, 145, 155 and 165, respectively. These satellite positioning signals are in a conventional GPS signal format. As illustrated by global positioning signal 165, each global positioning signal will arrive at antennas 210 and 220 of attitude determining system 100 at different times. This results in a phase delay between receipt of each positioning signal at the two antennas. As discussed above, the phase delay will have a fractional component and an integer component. Baseline vector d, which is an imaginary vector connecting antennas 210 and 220, is illustrated in FIG. 1 by arrow 225.

In addition to antennas 210 and 220, attitude determining system 100 includes GPS signal receive circuitry 230 and processor or processing circuitry 240. GPS signal receive circuitry 230 can be conventional GPS signal receive circuitry which receives, decodes and otherwise processes GPS positioning signals in a conventional manner, and which provides output signals or information 235 indicative of the information in the received GPS signals. Processor 240 is coupled to receive circuitry 230 and performs at least two functions in attitude determining system 100. From signals or information 235, processor 240 performs fractional phase delay determination functions 250 using methods known in the art. Processor 240 also performs integer cycle ambiguity determination functions 260 using signals or information 235 from GPS signal receive circuitry 230. As discussed below with reference to FIGS. 2–4, processor 240 implements methods of the present invention in order to perform integer cycle ambiguity determination functions 260 in a more efficient manner than conventional attitude determining systems.

Figure 2:
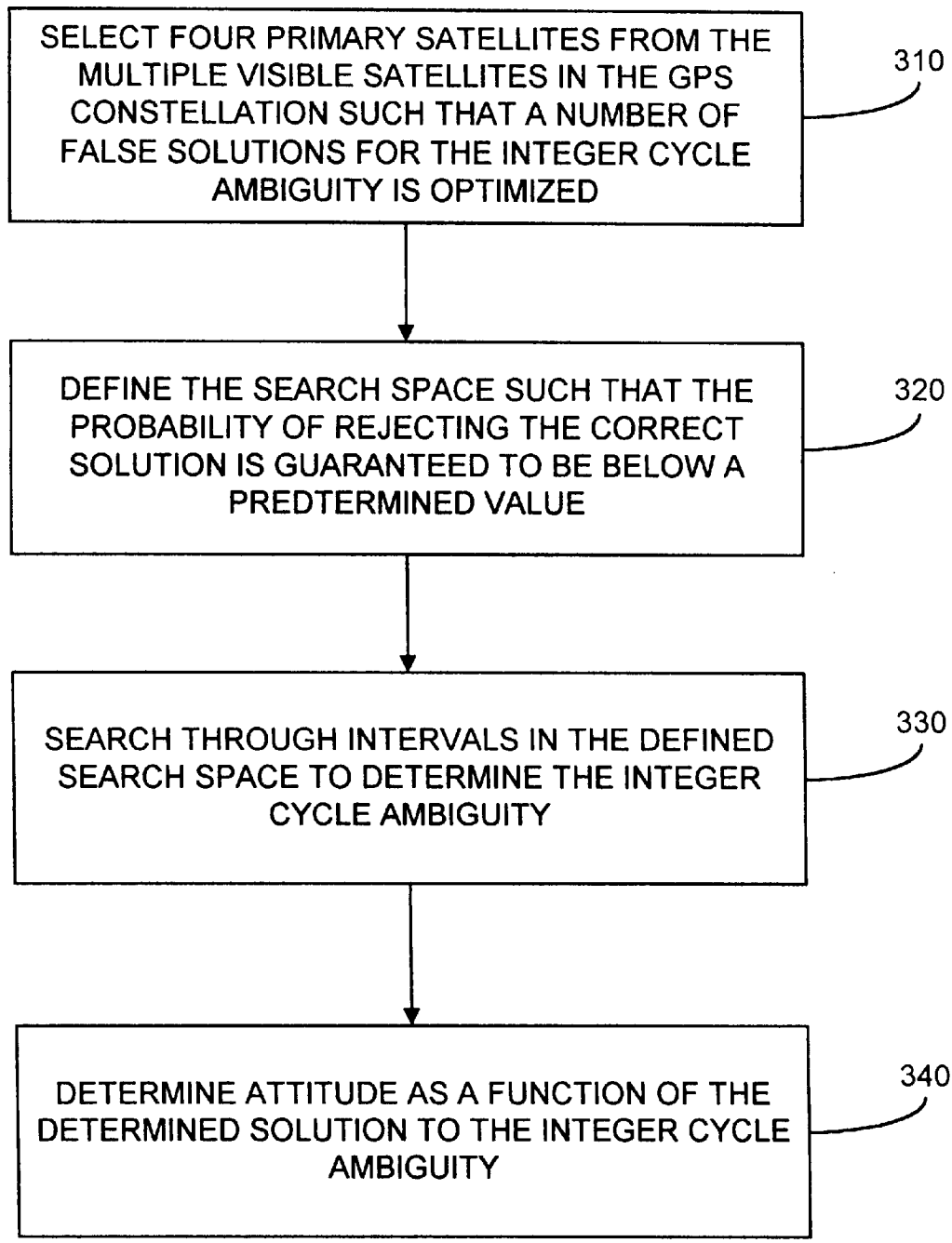
FIG. 2 is a flow diagram illustrating methods implemented by the attitude determining system shown in FIG. 1.

FIG. 2 is a block diagram illustrating an improved method of determining the integer cycle ambiguity in accordance with the present invention. The method illustrated generally in FIG. 2 and discussed more specifically below is implemented by processor or processing circuitry 240. First, as illustrated at block 310, four primary GPS satellites are selected from the multiple visible satellites in the GPS constellation. As discussed below in greater detail, in preferred methods of the present invention, the four primary satellites are selected in a manner which minimizes or otherwise optimizes a number of false solutions for the integer cycle ambiguity.

Next, at block 320, the search space is defined such that the probability of rejecting the correct integer cycle ambiguity solution is guaranteed to be below a predetermined value or threshold. Methods of defining the search space in order to guarantee that the performance of the search algorithm is bounded in this manner are discussed below in greater detail. At block 330, the integer cycle ambiguity is determined by searching through intervals in the defined search space. At block 340, attitude is determined as a function of the determined solution to the integer cycle ambiguity.

An integer ambiguity search based solely on baseline length will normally produce multiple solutions. The present invention includes methods of predicting the total number of solutions produced by the search, and of reducing the number of false solutions without exceeding a maximum probability of rejecting the true solution.

Reference is again made to block 310 of the flow diagram of FIG. 2 which describes the step of selecting four satellites which will minimize or optimize the number of false solutions in the search space. Each integer ambiguity corresponds to a set of parallel planes in the solution space. Each integer ambiguity vector corresponds to a point at the intersection of several planes. The set of discrete points including all the possible integer ambiguities forms the vertices of a grid in the solution space. The density of solution points in the solution space is the reciprocal of the volume of the parallelepiped formed by the grid between adjacent solution points. The volume of the parallelepiped formed by the grid is the determinant of the inverse of the difference line of sight matrix. Therefore, the density of solutions in the solution space is equal to the determinant of the difference line of sight matrix.

The volume of the search space is the volume of a spherical shell with radius equal to the baseline length and thickness equal to the length of the feasible interval given by Equation 5, which is discussed below in greater detail. The average number of solutions $N_s$ for each integer ambiguity search is equal to the volume of the search space times the density of solutions as defined by Equation 1.

$$E[N_s] = 4\pi \|d\|^2 \left(2k \frac{\sigma_m}{\sigma_3}\right) |\det L| \qquad \text{Equation 1}$$

where, $E[N_s]$ = the expected value or mean of the average number of solutions $N_s$;

$\|d\|$ = the length of the baseline vector $d$;

$k$ = a constant;

$L$ = the line of sight matrix;

$\sigma_m$ = the measurement noise standard deviation; and $\sigma_3$ = the smallest singular value of the weighted line of sight matrix $L$.

The line of sight matrix L, which is also known in the art as the matrix of direction cosines to satellites, can be factored into an orthonormal matrix and an upper triangular matrix as shown in Equation 2:

$$L = QR \qquad \text{Equation 2}$$

where,

R = the upper triangular matrix; and

Q = the orthonormal matrix.

For notational convenience, the substitution described in Equation 3 can be defined:

$$S = R^{-T} \qquad \text{Equation 3}$$

where,

S = the lower triangular matrix (having elements $S_{ij}$'s) with positive diagonal components.

Equations 2 and 3 specify the QR decomposition used in accordance with the present invention. Prior art algorithms, such as the Quinn-Brown algorithm, do not utilize the QR decomposition of the present invention.

The integer ambiguity search is performed using only four primary satellites, and the determinant of the line of sight matrix L depends upon which of the available satellites are chosen. The singular value $\sigma_3$ also depends upon which satellites are chosen, but the relationship is somewhat different than the relationship with the determinant of L. Thus it is possible to partially control the number of false solutions by choosing the four primary satellites carefully. Ideally, the satellites are chosen to minimize the ratio shown in Equation 4.

$$\frac{|\det L|}{\sigma_3} \qquad \text{Equation 4}$$

However, this procedure often leads to very small values for the determinant of L, which causes problems with numerical stability, since the matrix L must be inverted. A preferred strategy of the present invention is to empirically choose a target value for the determinant of L, and then to choose the four primary satellites that make the determinant of L closest to the target value.

Referring again to Equation 1, it is clear that baseline length is an important parameter to consider when designing an algorithm to resolve the integer ambiguities. The number of solutions found by the search is proportional to the square of the baseline length. A search based solely on baseline length can often find a unique solution for short baselines, but the number of solutions increases very quickly with baseline length, so additional criteria for eliminating false solutions become very important for longer baselines.

After selecting the four primary satellites, out of visible satellites 110, 120, 130, 140, 150 and 160, which will reduce the number of false solutions in the integer cycle ambiguity search, the search space is defined such that the probability of rejecting the correct integer ambiguity solution is guaranteed to be below a predetermined value. This is illustrated at block 320 of FIG. 2. Thus, in an instantaneous integer cycle ambiguity resolution algorithm, the maximum acceptable probability of rejecting the true solution can be specified. Then the performance of the algorithm is predictable, and other means can be employed to filter out false solutions.

The initial search space is established by comparing the baseline length as estimated from the data with the actual baseline length. A feasible interval around the true baseline length is determined, and any solution that results in a baseline length within the feasible interval is accepted. It is important that the probability of rejecting the true solution be kept reasonably small. The probability of rejecting the true solution depends upon the measurement noise variance and the geometry of the primary satellites. In addition, it is also important that the search produce as few false solutions as possible. The number of false solutions can be partially controlled through careful selection of the primary satellites used in the search.

Once a feasible interval is established for the baseline length, the search space is a spherical shell where the thickness of the shell is proportional to the maximum baseline variance. This search space is difficult to search efficiently because of the way in which the three position coordinates in the equation expressing the search space are coupled together. The present invention also includes an efficient algorithm for identifying all solutions that lie in the defined search space. The new algorithm is based upon a QR decomposition of the baseline covariance matrix that allows partial decoupling of the three position coordinates. In addition, the framework provided by the QR decomposition allows incorporation of a priori information, such as approximate attitude from code measurements, that further limits the search space.

The search for the true integer ambiguity vector is based on the known baseline length. If the phase errors are Gaussian distributed, then the length of the baseline vector corresponding to the true ambiguity solution may be arbitrarily far from the true baseline length. Thus it is necessary to accept any solution within some feasible interval around the true baseline length, and to acknowledge the fact that the true solution will occasionally fall outside the feasible interval. The width of the feasible interval is based on the measurement noise variance, the satellite geometry, and the maximum acceptable probability of rejecting the true solution. There will also be some number of false solutions that fall within the feasible interval. Most of the false solutions can usually be eliminated using additional constraints.

However, it is clearly advantageous to minimize the number of false solutions found by the initial search. In order for the search algorithm to have predictable and consistent performance over varying operating conditions, the width of the feasible interval should vary depending on satellite geometry.

A complete search of the space of all possible integer ambiguity combinations is computationally inefficient. A complete search corresponds to searching a three dimensional cube, while an optimal search corresponds to searching the surface of a sphere. The Quinn-Brown algorithm is optimal in the sense that it searches only the surface of a sphere. The search algorithm of the present invention searches the same space as the Quinn-Brown algorithm, however, a significant simplification of the algorithm is possible when using the QR decomposition of the differenced line of sight matrix.

Neglecting the statistical bias, the feasible interval for the estimate of baseline length is given by Equation 5:

$$\|d\| - k\frac{\sigma_m}{\sigma_3} \leq \|\hat{d}\| \leq \|d\| + k\frac{\sigma_m}{\sigma_3}, \qquad \text{Equation 5}$$

where k is an empirically determined constant. The integer ambiguity search algorithm of the present invention accepts all ambiguity vectors that result in a baseline estimate that satisfies Equation 5, then applies additional tests. The constant k can be adjusted to fine tune the performance of the algorithm and to compensate for unmodeled errors.

According to the present invention, the feasible interval for $N_1$ is given by Equation 6:

$$\phi_1 - \frac{r_H}{s_{11}} \leq N_1 \leq \phi_1 + \frac{r_H}{s_{11}}, \qquad \text{Equation 6}$$

where, $\phi_1$ = the first component of the phase measurements;

$r_H$ = the upper limit on the feasible interval, around the baseline length, that is to be searched;

$s_{11}$ = the first component of the matrix $S$ determined from the line of sight matrix $L$ and described in Equation 3; and $N_1$ = the first component of the integer ambiguity vector $N$.

Then, the rest of the algorithm is repeated for each value of $N_1$ in its feasible interval.

According to the invention, the rotated baseline vector $b=Q^T d$ is defined, and then the first component and part of the second component of the rotated baseline are calculated using the relationships of Equations 7 and 8:

$$b_1 = s_{11}(\phi_1 - N_1) \qquad \text{Equation 7}$$

$$c_1 = s_{21}(\phi_1 - N_1) \qquad \text{Equation 8}$$

The feasible interval for $N_2$ (the second component of the integer ambiguity vector N) is given by Equation 9:

$$\phi_2 - \frac{-c_1 + \sqrt{r_H^2 - b_1^2}}{s_{22}} \leq N_2 \leq \phi_2 - \frac{-c_1 - \sqrt{r_H^2 - b_1^2}}{s_{22}}, \qquad \text{Equation 9}$$

Then, the rest of the algorithm is repeated for each value of $N_2$ in its feasible interval.

Next, the second component and part of the third component of the rotated baseline are calculated using Equations 10 and 11:

$$b_2 = c_1 = s_{22}(\phi_2 - N_2) \qquad \text{Equation 10}$$

where, $\phi_2$ = the second component of the phase measurements.

$$c_2 = s_{31}(\phi_1 - N_1) + s_2(\phi_2 - N_2) \qquad \text{Equation 11}$$

The two feasible intervals for $N_3$ (the third component of the integer ambiguity vector N) are given by Equation 12:

$$\phi_3 - \frac{-c_2 + \sqrt{r_H^2 - b_1^2 - b_2^2}}{s_{33}} \leq N_3 \leq$$

$$\phi_3 - \frac{-c_2 + \sqrt{r_L^2 - b_1^2 - b_2^2}}{s_{33}}$$

or $$\phi_3 - \frac{-c_2 - \sqrt{r_L^2 - b_1^2 - b_2^2}}{s_{33}} \leq N_3 \leq$$

$$\phi_3 - \frac{-c_2 - \sqrt{r_H^2 - b_1^2 - b_2^2}}{s_{33}}$$

Equation 12 where, $\phi_3$ = the third component of the phase measurements; and $r_L$ = the lower limit on the feasible interval, around the baseline length, that is to be searched.

Three versions of the search algorithm (algorithm 1, algorithm 2 and algorithm 3) were simulated using random baseline orientations and random satellite constellations. The number of satellites in the constellation was varied to show how the three versions of the algorithm perform under varying conditions. The search algorithms use only four primary satellites out of the constellation. However, a smaller constellation means that the algorithms have fewer satellites to choose from when choosing the four primary satellites.

Algorithms 1 and 2 both choose four primary satellites that are most widely spaced, but algorithm 1 uses a constant width feasible interval for the baseline length, and algorithm 2 uses the feasible interval for the baseline length given by Equation 1. Thus, algorithms 1 and 2 can be compared to determine the effect of basing the width of the feasible interval on satellite geometry. Algorithm 3 also uses the feasible interval given by Equation 1, but selects the primary satellites to minimize the number of solutions. Algorithms 2 and 3 both use a 2-sigma radius for the feasible interval (i.e. k=2 in Equation 5), so the maximum limit on the probability of rejecting the true solution guaranteed by design is around 5 percent. Thus, algorithms 2 and 3 can be compared to determine the effect of selecting the primary satellites to minimize the number of solutions.

Figure 3:
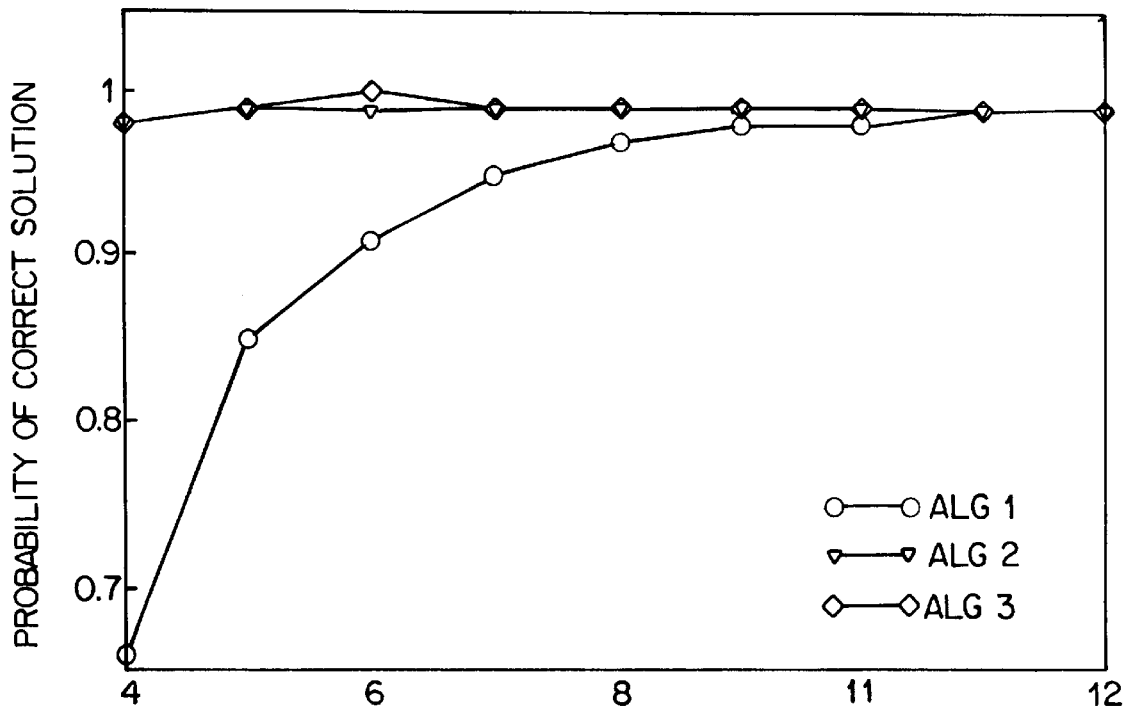
FIGS. 3 and 4 are plots illustrating aspects of the present invention.

FIG. 3 shows the probability that the solution set contains the true solution, plotted against the number of satellites, for all three versions of the algorithm. For algorithm 1, the probability of rejecting the true solution varies, since the width of the feasible interval for the baseline length does not depend upon satellite geometry. For algorithms 2 and 3, the probability of rejecting the true solution is stabilized, since the width of the feasible interval for baseline length varies with satellite geometry. Furthermore, for algorithms 2 and 3, the probability of rejecting the true solution is always less than the maximum specified for the design. Therefore, use of the feasible interval given by Equation 1 results in a stable and predictable probability of rejecting the true solution.

Figure 4:
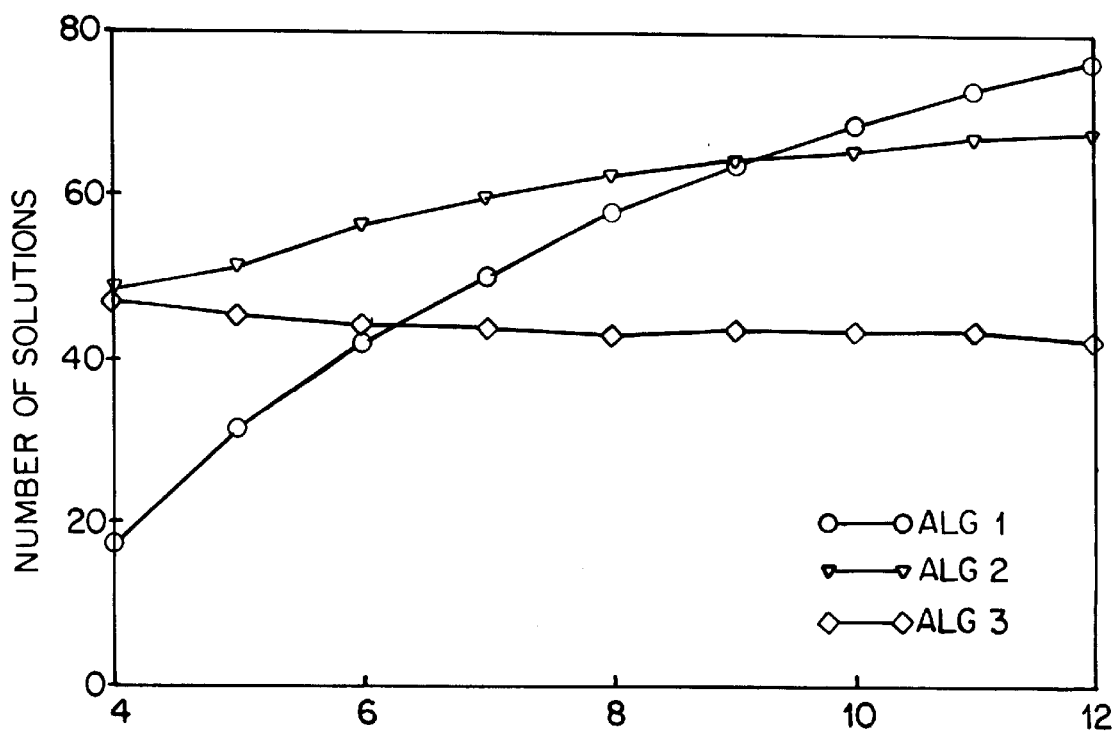

FIG. 4 shows the average number of solutions produced as a function of the number of satellites in the constellation for all three versions of the algorithm. As was the case in FIG. 3, the number of satellites is shown on the horizontal axis of the plot. Algorithm 3 produces fewer false solutions than algorithm 2, because algorithm 3 selects as primary the four satellites that approximately minimize the number of solutions, while algorithm 2 selects as primary the four satellites that are most widely spaced. Therefore, the number of false solutions can be controlled through careful selection of the primary satellites.

As discussed above, the present invention includes an optimal algorithm for searching the integer cycle ambiguity space and identifying all solutions for which the baseline length is within a feasible interval around the true baseline length. The algorithm is optimal in the sense that it eliminates all solutions that do not lie within the feasible interval without actually calculating any solution outside the feasible interval. The algorithm is similar to the Quinn-Brown algorithm. However, the QR decomposition of the differenced line of sight matrix is used to achieve a significant simplification of the calculations.

There is always some nonzero probability that the search based on baseline length will not identify the true solution. Although the possibility that the true solution will be rejected cannot be eliminated, the probability that the true solution will be rejected can be controlled. According to the methods of the present invention, the probability of rejecting the true solution is guaranteed to be less than some chosen value.

There are frequently many false solutions that lie in the feasible interval for baseline length. Although additional criteria can be used to eliminate most of the false solutions, it is clearly advantageous to minimize the number of solutions that pass the baseline length test. The present invention includes a method of choosing the four primary satellites so that the number of false solutions is minimized.

Additional measurements or constraints are available in particular applications and are very useful for limiting the search space. Additional measurements not only reduce the integer ambiguity search space, but can also increase the robustness of the search when measurement noise variance is large. Additional constraints can be used in the search with minimal modification of the basic algorithm.

Although the present invention has been described with reference to preferred embodiments, workers skilled in the art will recognize that changes may be made in form and detail without departing from the spirit and scope of the invention.

What is claimed is:

1. A method of determining a solution to an integer cycle ambiguity in a global positioning system (GPS) attitude determination system, the method comprising:

selecting four primary satellites out of a plurality of satellites in a GPS satellite constellation such that a number of false solutions for the integer cycle ambiguity is optimized;

defining a search space such that the probability of rejecting a correct solution for the integer cycle ambiguity is guaranteed to be below a predetermined value;

searching through intervals in the defined search space to determine a solution to the integer cycle ambiguity; and determining attitude as a function of the determined solution to the integer cycle ambiguity.

2. The method of claim 1, wherein selecting the four primary satellites out of the plurality of satellites in the GPS satellite constellation further includes selecting the four primary satellites out of the plurality of satellites which minimize the ratio:

$$\frac{|\det L|}{\sigma_3}.$$

3. The method of claim 1, wherein selecting the four primary satellites out of the plurality of satellites in the GPS satellite constellation further includes:
   generating a target value for the determinant of the line of sight vector L; and
   selecting the four primary satellites, out of the plurality of satellites, which cause the determinant of L to be closest to the generated target value.

4. The method of claim 1, wherein defining the search space such that the probability of rejecting the correct solution for the integer cycle ambiguity is guaranteed to be below a predetermined value further includes:
   comparing an estimated baseline length with an actual baseline length; and
   determining an interval around the actual baseline length as a function of the comparison.

5. The method of claim 4, wherein determining the interval around the actual baseline length further includes determining a feasible interval for a first component of an integer ambiguity vector as a function of an upper limit on the feasible interval.

6. The method of claim 5, wherein determining the interval around the actual baseline length further includes determining a feasible interval for a second component of the integer ambiguity vector.

7. The method of clam 6, wherein determining the interval around the actual baseline length further includes determining a feasible interval for a third component $N_s$ of the integer ambiguity vector as a function of a lower limit on the feasible interval.

8. The method of claim 4, wherein searching through intervals in the defined search space to determine the solution to the integer cycle ambiguity further includes accepting any solution to the integer cycle ambiguity which is within the determined interval.

9. The method of claim 4, wherein the interval is determined as a function of satellite geometry of the four primary satellites relative to the GPS attitude determination system.

10. The method of claim 9, wherein the interval is further determined as a function of a measurement noise variance $\sigma_m^2$.

11. The method of claim 10, wherein the interval is further determined as a function of a maximum probability of rejecting the correct solution for the integer cycle ambiguity defined by the predetermined value.

12. An attitude determining system adapted to determine a solution to an integer cycle ambiguity, attitude determining system comprising:
   satellite selection means for selecting four primary satellites out of a plurality of satellites in a GPS satellite constellation such that a number of false solutions for the integer cycle ambiguity is optimized;
   search space definition means for defining a search space such that the probability of rejecting a correct solution for the integer cycle ambiguity is guaranteed to be below a predetermined value;
   searching means for searching through intervals in the defined search space to determine a solution to the integer cycle ambiguity; and
   attitude determining means for determining attitude as a function of the determined solution to the integer cycle ambiguity.

13. An attitude determining system comprising:
   a first antenna for receiving satellite positioning signals from a plurality of global positioning system satellites;
   a second antenna for receiving the satellite positioning signals from the plurality of global positioning system satellites;
   signal receive circuitry coupled to the first and second antennas and receiving the satellite positioning signals, the signal receive circuitry providing as an output signals indicative of information contained within the global positioning signals; and
   processing circuitry coupled to the signal receive circuitry and adapted to determine a solution to an integer cycle ambiguity as a function of the output signals, wherein the processing circuitry is adapted to select four primary satellites out of the plurality of satellites such that a number of false solutions for the integer cycle ambiguity is optimized, to define a search space such that the probability of rejecting a correct solution for the integer cycle ambiguity is guaranteed to be below a predetermined value, to search through intervals in the defined search space to determine a solution to the integer cycle ambiguity, and to determine attitude as a function of the determined solution to the integer cycle ambiguity.

14. The attitude determining system of claim 13, wherein the processing circuitry selects the four primary satellites, out of the plurality of satellites, which minimize the ratio:

$$\frac{|\det L|}{\sigma_3}.$$

15. The attitude determining system of claim 13, wherein the processing circuitry is adapted to select the four primary satellites by generating a target value for the determinant of the line of sight vector L, and by selecting the four primary satellites which cause the determinant of L to be closest to the generated target value.

16. The attitude determining system of claim 13, wherein the processing circuitry is adapted to define the search space such that the probability of rejecting the correct solution for the integer cycle ambiguity is guaranteed to be below a predetermined value by comparing an estimated baseline length with an actual baseline length, and by determining an interval around the actual baseline length as a function of the comparison.

17. The attitude determining system of claim 16, wherein the processing circuitry is adapted to determine the interval around the actual baseline length by determining a feasible interval for a first component of an integer ambiguity vector as a function of an upper limit on the feasible interval.

18. The attitude determining system of claim 17, wherein the processing circuitry is further adapted to determine the interval around the actual baseline length by determining a feasible interval for a second component of the integer ambiguity vector.

19. The attitude determining system of clam 18, wherein the processing circuitry is further adapted to determine the interval around the actual baseline length by determining a feasible interval for a third component $N_s$ of the integer ambiguity vector as a function of a lower limit on the feasible interval.

20. The attitude determining system of claim 16, wherein the processing circuitry is further adapted to determine the interval as a function of satellite geometry of the four primary satellites relative to a position of the attitude determination system.

* * * * *